(12) United States Patent
McNair et al.

(10) Patent No.: US 10,626,886 B2
(45) Date of Patent: Apr. 21, 2020

(54) SOUND ATTENUATION APPARATUS AND METHODS

(71) Applicant: HONEYWELL INTERNATIONAL INC., Morris Plains, NJ (US)

(72) Inventors: Mark McNair, Gilbert, AZ (US); William Schuster, Phoenix, AZ (US); Donald G. Godfrey, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 133 days.

(21) Appl. No.: 15/956,017

(22) Filed: Apr. 18, 2018

(65) Prior Publication Data

US 2019/0323522 A1    Oct. 24, 2019

(51) Int. Cl.
| | |
|---|---|
| *F04D 29/66* | (2006.01) |
| *B32B 3/12* | (2006.01) |
| *F01D 25/30* | (2006.01) |
| *F16L 55/033* | (2006.01) |
| *F24F 13/24* | (2006.01) |

(52) U.S. Cl.
CPC .............. *F04D 29/664* (2013.01); *B32B 3/12* (2013.01); *F01D 25/30* (2013.01); *F16L 55/0336* (2013.01); *F24F 13/24* (2013.01); *B32B 2305/024* (2013.01); *B32B 2605/18* (2013.01); *F05D 2250/51* (2013.01)

(58) Field of Classification Search
CPC ... F04D 29/664; B32B 3/12; B32B 2305/024; B32B 2605/18; F01D 25/30; F16L 55/0336; F24F 13/24; F02K 1/827; F02C 7/045; F02C 7/24

USPC .......................................... 181/224, 292, 293
See application file for complete search history.

(56) References Cited

U.S. PATENT DOCUMENTS

| | | |
|---|---|---|
| 1,816,769 A | 7/1931 | Fisk |
| 2,704,504 A | 3/1955 | Wilkening |
| | (Continued) | |

FOREIGN PATENT DOCUMENTS

| | | |
|---|---|---|
| EP | 2846030 A1 | 3/2015 |
| EP | 2953130 A1 | 12/2015 |
| | (Continued) | |

OTHER PUBLICATIONS

Bozak, R., et al.; W-8 Acoustic Casing Treatment Test Overview; Acoustics Technical Working Group NASA Langley Research Center Apr. 11-12, 2017.

(Continued)

*Primary Examiner* — Jeremy A Luks
(74) *Attorney, Agent, or Firm* — Lorenz & Kopf, LLP

(57) ABSTRACT

A sound attenuation apparatus includes a body and a stacked cavity structure. The structure includes a structure inlet formed in the top surface of the body; a passage extending from the structure inlet into the interior of the body to a base surface within the body; a first cavity with a first cavity inlet fluidly coupled to the passage and being formed by a first arm, a first side wall within the interior of the body, and the base surface; and a second cavity with a second cavity inlet fluidly coupled to the passage and being formed by a second arm, the first side wall, and the first arm. Each of the first and second arms extends from the first side wall and includes at least two arm segments oriented at different angles relative to the first side wall longitudinal axis.

12 Claims, 11 Drawing Sheets

(56) References Cited

U.S. PATENT DOCUMENTS

| | | | |
|---|---|---|---|
| 4,001,473 A | 1/1977 | Cook | |
| 4,100,993 A * | 7/1978 | Feder | G10K 11/172 181/213 |
| 4,336,863 A | 6/1982 | Satomi | |
| 5,869,792 A * | 2/1999 | Allen | F01D 25/30 181/224 |
| 6,705,428 B2 * | 3/2004 | Kudernatsch | F01D 25/30 181/224 |
| 7,806,228 B2 * | 10/2010 | Dyck | E04F 17/04 181/224 |
| 8,240,427 B2 * | 8/2012 | Jangili | F01D 25/30 181/222 |
| 8,459,407 B2 * | 6/2013 | Jangili | F01D 25/30 181/213 |
| 9,290,274 B2 * | 3/2016 | Roach | B64D 33/02 |
| 9,303,588 B2 * | 4/2016 | Pongratz | G10K 11/172 |
| 9,574,791 B2 * | 2/2017 | Lind | F24F 7/04 |
| 9,909,471 B2 * | 3/2018 | Mattia | F02K 1/827 |
| 2002/0182061 A1 | 12/2002 | Han | |
| 2005/0161280 A1 * | 7/2005 | Furuya | F01N 1/003 181/225 |
| 2010/0077755 A1 | 4/2010 | Jangili et al. | |
| 2015/0122576 A1 | 5/2015 | Kim | |
| 2017/0122341 A1 | 5/2017 | Alonso-Miralles et al. | |
| 2017/0276397 A1 | 9/2017 | Mouratidis | |

FOREIGN PATENT DOCUMENTS

| | | |
|---|---|---|
| FR | 2943594 A1 | 10/2010 |
| WO | 2017056097 A1 | 4/2017 |

OTHER PUBLICATIONS

VanZante, D., et al.; Propulsion Noise Reduction Research in the NASA Advanced Air Transport Technology Project; ittps://ntrs.nasa.gov/search.jsp?R=20170008825 2018-04-18T17:27:03+00:00Z.

Gazella, M.R., et al.; Evaluating the Acoustic Benefits of Over-the-Rotor Acoustic Treatments Installed on the Advanced Noise Control Fan; https://ntrs.nasa.gov/search.jsp?R=20170006851 2018-04-18T17:32:04+00:00Z.

* cited by examiner

SOUND ATTENUATION APPARATUS AND METHODS

TECHNICAL FIELD

The subject matter disclosed herein relates to sound attenuation apparatus, and more particularly, to sound attenuation apparatus and methods of manufacturing the same that may be used in connection with turbine systems.

BACKGROUND

During operation, machinery may generate sound-causing vibrations. For example, modern aircraft may include various turbine systems such as jet engines (e.g., one or more gas-powered turbine engines), auxiliary power units (APUs), and/or environmental control systems (ECSs). Although such aircraft systems are generally safe, reliable, and efficient, these systems may be sources of noise or other types of unwanted sound, especially during aircraft take-off and landing operations, as well as while an aircraft is idling or taxiing at the airport.

To mitigate sound emanating from aircraft, various types of reduction mechanisms have been developed. Although present approaches exhibit fairly good sound suppression characteristics, there is continuing need for improved attenuation configurations to reduce manufacturing costs and increase effectiveness. Furthermore, other desirable features and characteristics will become apparent from the subsequent detailed description of the inventive subject matter and the appended claims, taken in conjunction with the accompanying drawings and this background.

BRIEF SUMMARY

In one embodiment, a sound attenuation apparatus is provided for arrangement on a mounting surface of a duct. The apparatus includes a body with an interior extending between a bottom surface facing the mounting structure and a top surface and a stacked cavity structure. The structure includes a structure inlet formed in the top surface of the body; a passage extending from the structure inlet into the interior of the body to a base surface within the interior of the body; a first cavity with a first cavity inlet fluidly coupled to the passage and being formed by a first arm, a first side wall within the interior of the body with a first side wall longitudinal axis, and the base surface; and a second cavity with a second cavity inlet fluidly coupled to the passage and being formed by a second arm, the first side wall, and the first arm. The first arm extends from the first side wall and includes at least two first arm segments oriented at different angles relative to the first side wall longitudinal axis, and the second arm extends from the first side wall and includes at least two second arm segments oriented at different angles relative to the first side wall longitudinal axis.

In another embodiment, a stacked cavity structure is provided for arrangement on a mounting surface of a duct. The structure includes a support spine configured to be arranged on the mounting surface and extending into the duct with a longitudinal axis defining a longitudinal orientation; and a plurality of arms extending from the support spine and at least partially forming a plurality of overlapping cavities relative to the longitudinal orientation. Each of the plurality of arms includes at least a proximal first arm segment and a distal first arm segment.

In a further embodiment, a method is provided for manufacturing a sound attenuation apparatus. The method includes generating a three-dimensional digital model of the sound attenuation apparatus and manufacturing the sound attenuation apparatus based on the model using an additive manufacturing technique. The model includes a body with an interior extending between a bottom surface and a top surface; and a stacked cavity structure having a structure inlet formed in the top surface of the body; a passage extending from the structure inlet into the interior of the body to a base surface within the interior of the body; a support spine formed within the interior of the body with a longitudinal axis defining a longitudinal orientation; and a plurality of arms extending from the support spine and at least partially forming a plurality of overlapping cavities relative to the longitudinal orientation with cavity inlets fluidly coupled to the passage. Each of the plurality of arms include a proximal first arm segment extending from the support spine and a first distal arm segment oriented at an angle relative to the proximal first arm segment.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

The embodiments described herein are generally directed to sound attenuation, particularly for the suppression of noise generated by operating machinery, such as turbine systems. For purposes of illustration, certain embodiments provided herein will be described in the context of sound attenuation apparatus implemented on an aircraft, such as on a gas turbine engine, on an APU, or on an ECS. However, the present disclosure should not be viewed as limited to such aircraft-based implementations. Rather, it will be appreciated that the apparatus and methods described herein will find utility in any system that employs the use of operating machinery generating unwanted noise.

Generally, sound attenuation apparatus in accordance with the present disclosure includes an array of stacked cavity structures to provide sound attenuation in one or more forms, including passive destructive interference, dissipation, and/or absorption, thereby creating a reduction in overall sound level. Additive manufacturing techniques may be used to manufacture the pattern of structures, passages, and cavities that make up the sound attenuation apparatus.

Figure 1:
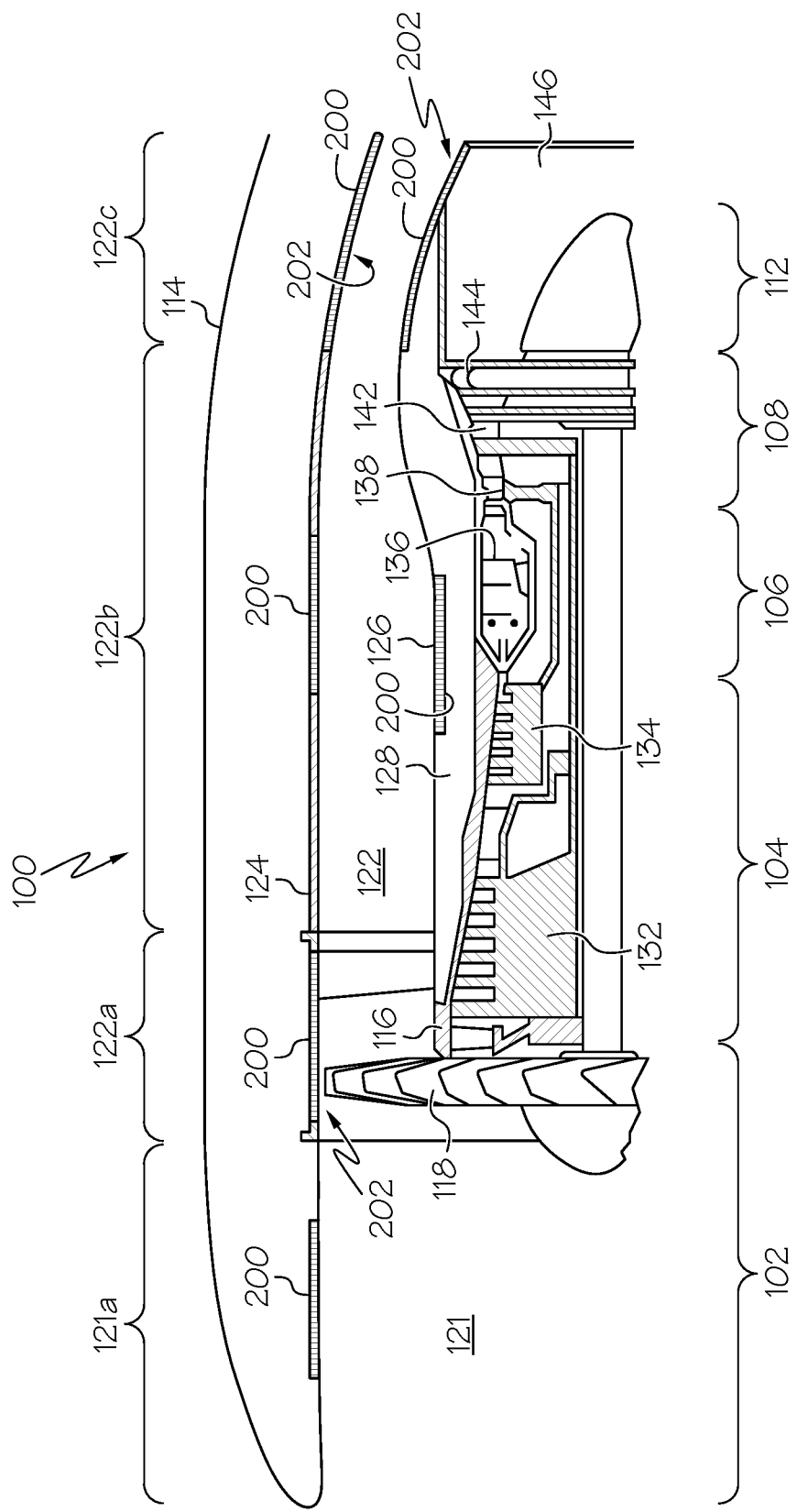
FIG. 1 is a cross-sectional view of a gas turbine engine implementing a sound attenuation apparatus in accordance with an exemplary embodiment.

Turning now to FIG. 1, the implementation of an exemplary sound attenuation apparatus may be provided in the context of a gas turbine engine 100 for purposes of non-limiting illustration. The gas turbine engine 100 generally includes an intake section 102, a compressor section 104, a combustion section 106, a turbine section 108, and an exhaust section 112. In this example, the intake section 102, compressor section 104, combustion section 106, turbine section 108, and exhaust section 112 are mounted within a nacelle 114; and the compressor section 104, combustion section 106, and turbine section 108 are mounted within an engine case 116.

The intake section 102 includes a fan 118 that draws and accelerates air into the engine 100. A fraction of the accelerated air is directed through a fan air bypass duct 122 defined by an outer fan duct wall 124, spaced apart from and surrounding an inner fan duct wall 126. Most of the air that flows through the fan air bypass duct 122 is discharged to generate a forward thrust. The fraction of accelerated air that does not flow into the fan air bypass duct 122 is directed into the compressor section 104. In the process of performing work on the air, turbomachinery components generate undesirable noise through various mechanisms, such as rotor steady loading noise, rotor-stator interaction noise, broadband trailing edge noise, and others. This noise propagates upstream through the inlet and downstream through the bypass duct, and thereafter propagates outside the engine. Accordingly, it may be desirable to implement one or more sound attenuation apparatus 200 at the inlet 121 and/or at the bypass duct 122. Greater detail regarding sound attenuation apparatus 200 is provided below in connection with FIG. 2. As shown in FIG. 1, the apparatus 200 may be located at the inlet duct 121a, as well as at any or all of an forward portion 122a of duct 122, a middle portion 122b of duct 122, and aft portion 122c of duct 122. Additionally, the apparatus 200 may be configured as part of either (or both) of outer duct wall 124 and inner duct wall 126. Wherever implemented, the apparatus 200 may be provided in an annular configuration corresponding to the shape of the respective duct wall 124, 126, with an axial length extending along the rotational axis of the turbine engine 100, or discrete sections. Although example positions of the apparatus 200 are shown in FIG. 1, the apparatus 200 may be incorporated into any aircraft or engine system that otherwise generates or transmits unwanted sound.

With continued reference to FIG. 1, the compressor section 104 may include one or more compressors. The engine 100 depicted in FIG. 1 includes two compressors (e.g., an intermediate pressure compressor 132 and a high pressure compressor 134) to pressurize incoming air, although it should be appreciated that any number of compressors may be included. The relatively high pressure air discharged from the compressor section 104 is directed into the combustion section 106. The combustion section 106 includes a combustor 136 that is coupled to receive the relatively high pressure air as well as atomized fuel. The relatively high pressure air and atomized fuel are mixed and ignited within the combustor 136 to generate combusted air. The combusted air is then directed into the turbine section 108. The depicted turbine section 108 includes three turbines (e.g., a high pressure turbine 138, an intermediate pressure turbine 142, and a low pressure turbine 144), although it should be appreciated that any number of turbines may be included. The combusted air is directed into the turbine section 108 to rotate each of turbines 138, 142, 144. The air is then exhausted through a propulsion nozzle 146 disposed in the exhaust section 112 to provide additional forward thrust. As the turbines 138, 142, 144 rotate, each may drive equipment, such as compressors 134, 132 and fan 118, in the gas turbine engine 100 via concentrically disposed shafts or spools.

With the inclusion of sound attenuation apparatus 200, noise generated by gas turbine engine 100 may be reduced. That is, during operation, sound generated by fan air flowing through bypass duct 122, such as through any or all of the forward portion 122a, the middle portion 122b, and the aft portion 122c, may be attenuated by the inclusion of the apparatus 200 along either wall 124 or 126 of either portion 122a, 122b, or 122c.

Figure 2:
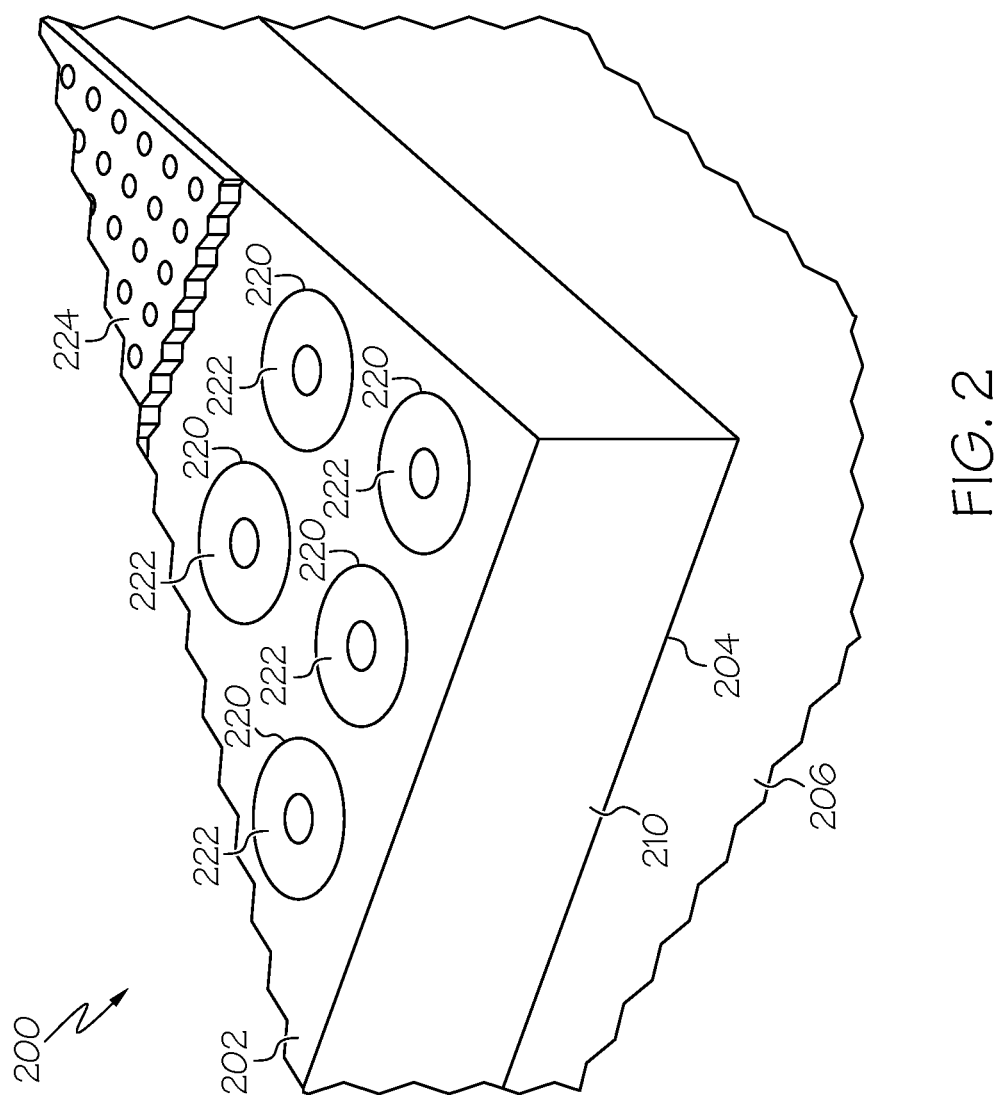
FIG. 2 is a perspective, cutaway view of a sound attenuation apparatus that may be incorporated into the engine of FIG. 1 in accordance with an exemplary embodiment.

FIG. 2 is a partial perspective, cutaway view of a sound attenuation apparatus 200 according to an exemplary embodiment. The sound attenuation apparatus 200 is adapted to reduce or suppress an amount of noise that may travel from one area to another, for example within various flow ducts and passages of equipment, such as turbine engines, APUs, and ECSs, that may be found in an aircraft. According to an embodiment, the sound attenuation apparatus 200 may be disposed in an aircraft to reduce noise that may emanate from an engine. For example, the sound attenuation apparatus 200 may be placed in an aircraft air duct, such as an air inlet plenum or an engine exhaust duct, as illustrated in FIG. 1.

Generally, the sound attenuation apparatus 200 may include a body 210 with an interior extending between a fluid-facing (or top) surface 202 and a base (or bottom) surface 204. The top surface 202 is oriented toward the sound-carrying fluid (e.g., air) flowing through the subject structure 206 (e.g., a duct), and the bottom surface 204 is secured to a wall of the subject structure 206. The top surface may incorporate a porous face sheet 224, such as a screen or perforated sheet, to allow sounds waves to enter into the attenuating structure 210 while serving as a mechanically protective or drag reducing component. Additionally, the porous face sheet 224 may be tailored to assist in the dissipation of acoustic energy. The bottom surface 204 may be formed by, or mounted on, a backing plate. As described in greater detail below, one or more stacked cavity structures 220 are formed within the body 210 with openings or inlets 222 on the top surface 202 fluidly coupled to the interior portions of the structures 220. The surface inlets 222 are configured to receive sound energy from a sound source, such as the engine, and to allow at least a portion of the sound to pass into the inlets 222, and thus, the stacked cavity structures 220. Portions of the face sheet 224 have been removed in FIG. 2 to depict the inlets 222 of the structures 220. In some examples, the sheet 224 may be completely or partially omitted.

In the embodiment depicted in FIG. 2, the sound attenuation apparatus 200 is in the form of a panel with the body 210 having an array of the stacked cavity structures 220 formed therein. In other embodiments, the sound attenuation apparatus 200 may be formed by an array or arrangement of individual apparatus 200, each with one or more stacked cavity structures 220 positioned adjacent one another along the mounting surface of the subject structure 206. The stacked cavity structures 220 and/or inlets 222 may have any suitable sizes and spacings, aspects of which will be discussed in greater detail below. Alternate array arrangements of the stacked cavity structures 220 are possible.

As described in greater detail below, the stacked cavity structures 220 of the sound attenuation apparatus 200 operate to suppress or attenuate noise within a system, particularly sound traveling over the top surface 202 of the apparatus 200.

Figure 3:
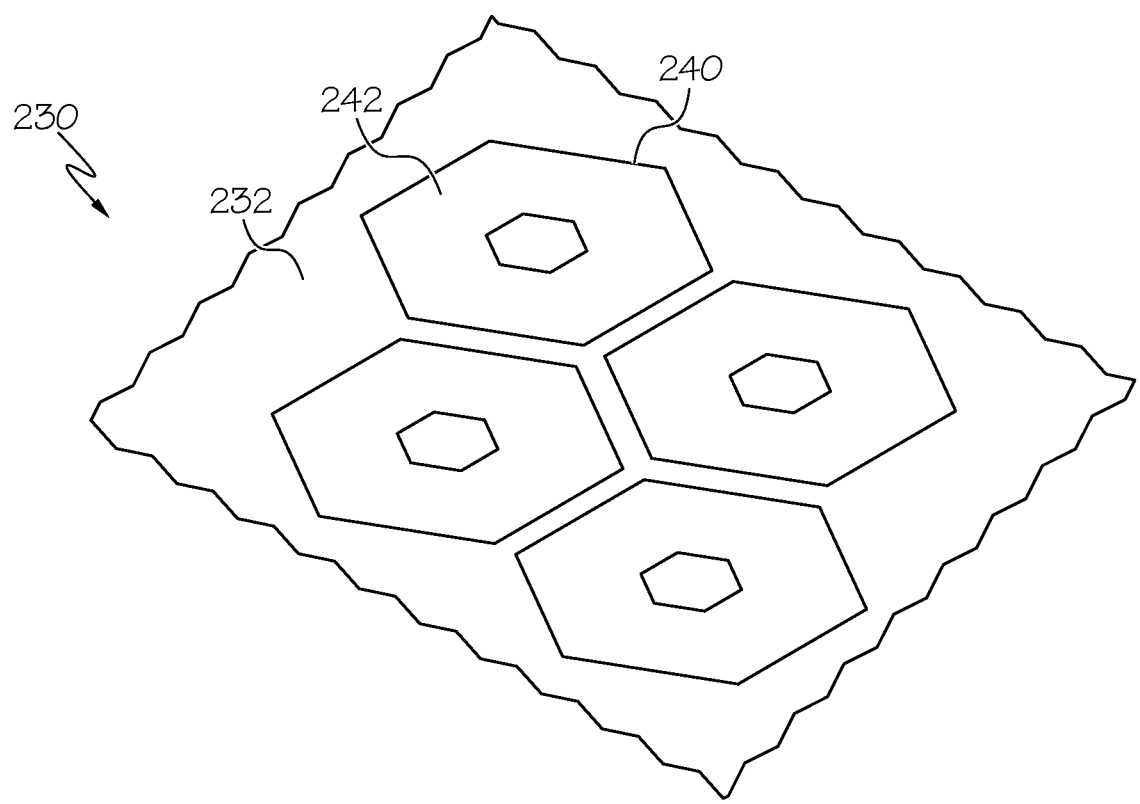
FIGS. 3 and 4 are respective partial views of a top surface of a sound attenuation apparatus that may be incorporated into the engine of FIG. 1 in accordance with further exemplary embodiments.
Figure 4:
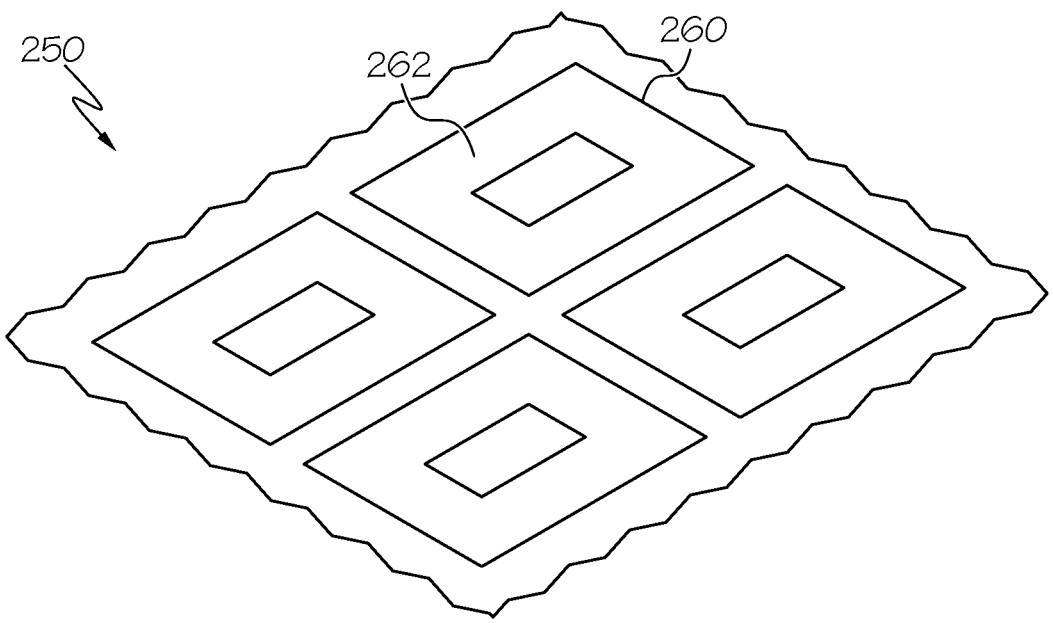

As depicted in FIG. 2, the stacked cavity structures 220 may have a circular cross-sectional shape. However, other shapes may be provided. Additional examples are depicted in FIGS. 3 and 4, which are partial top surface views. In particular, FIG. 3 depicts a sound attenuation apparatus 230 with stacked cavity structures 240 having a hexagonal shape, as indicated by the inlets 242 formed in a body top surface 232 of the apparatus 230. In particular, FIG. 4 depicts a sound attenuation apparatus 250 with stacked cavity structures 260 having a square shape, as indicated by the inlets 262. Although any shape may be provided, certain shapes, such as hexagonal, square, diamond, octagonal, triangular, and the like, may enable a greater number of structures to be formed in the apparatus. This may enable a greater amount of sound attenuation and/or a reduction in the overall weight of the structure.

Figure 5:
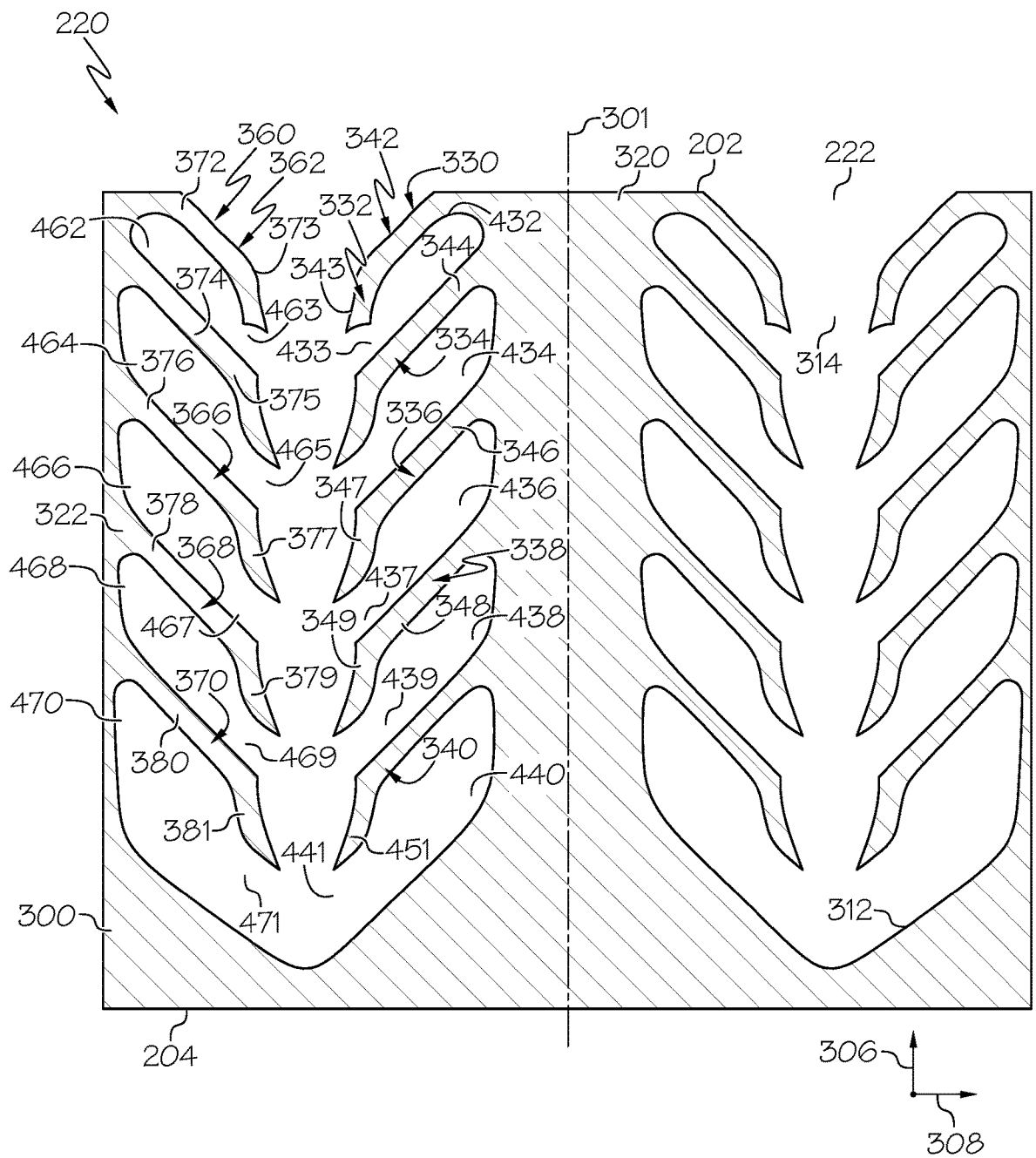
FIG. 5 is a cross-sectional view of a stacked cavity structure that may be incorporated into the sound attenuation apparatus of FIG. 2 in accordance with an exemplary embodiment.

FIG. 5 is a cross-sectional view of a stacked cavity (or chamber) structure 220 that may be incorporated into the sound attenuation apparatus 200 according to an exemplary embodiment. As noted above, the stacked cavity structure 220 may be formed by, or formed within, a body portion 300 (e.g., a portion of body 210 of FIG. 2). In the depicted embodiment of FIG. 5, the stacked cavity structure 220 is annular such that the body portion 300 includes a support spine 320, side wall 322, an inner arm arrangement 330 extending from the support spine 320, and an outer arm arrangement 360 extending from the side wall 322. With additional reference to FIG. 2, the body portion 300 may have a bottom surface 204 facing a mounting surface and a top surface 202 that faces the area intended for sound suppression, such as an interior of the duct. Generally, the stacked cavity structure 220 may be considered to have a longitudinal axis 301 extending through the support spine 320 that is orthogonal to the direction of fluid flow across the top surface 202, although other embodiments may have different orientations.

The structure 220 may be annular with the complete view being rotated about axis 301. In this example, the structure 220 is axisymmetric about axis 301. As described in greater detail below, the structure 220 may have other shapes, including asymmetric and/or non-annular. For example, the structure 220 may be generated by sweeping the applicable cross-sectional shape along a curve, or rotating about an axis (e.g., axis 301). With respect to the longitudinal axis 301, characteristics of the annular stacked cavity structure 220 may be considered with respect to a radial orientation 306, an axial (or longitudinal) orientation 308, and a circumferential orientation (orthogonal to the radial and axial orientations 306, 308). Additionally, although FIG. 5 depicts an example with the structure 220 described above with reference to FIG. 2, structures with other shapes (e.g., structures 240, 260 of FIGS. 3 and 4) are also applicable to the arm and cavity descriptions provided herein.

Along the radial orientation 306, the stacked cavity structure 220 extends from a structure inlet 222, introduced above, to a structure base surface 312. Within the interior of the structure 220, the inner and outer arm arrangements 330, 360 form a center passage 314; the inner arm arrangement 330 forms a number of inner cavities 432, 434, 436, 438, 440; and the outer arm arrangement 360 forms a number of outer cavities 462, 464, 466, 468, 470. The center passage 314 extends from the inlet 222 to the base surface 312. In effect, the inner and outer cavities 432, 434, 436, 438, 440; 462, 464, 466, 468, 470 are "stacked" on one another along the axial orientation with each being fluidly coupled to the center passage 314 in the radial orientation. As used herein, the term "stacked" refers to one or more of the cavities completely or partially overlapping other, underlying cavities along the axial orientation.

The inner arm arrangement 330 includes a number of arms 332, 334, 336, 338, 340 that collectively form the inner cavities 432, 434, 436, 438, 440 with the support spine 320. For example, the lower surface of arm 332 and upper surface of arm 334 form inner cavity 432 with spine 320. Similarly, arms 334, 336 form cavity 434; arms 336, 338 form cavity 436; and arms 338, 340 form cavity 438. Arm 340 forms the bottom-most cavity 440 with the base surface 312. Each of the inner arms 332, 334, 336, 338, 340 is formed by at least two arm segments 342, 343; 344, 345; 346, 347; 348, 349; 350, 351. In particular, each inner arm 332, 334, 336, 338, 340 is formed by a proximal arm segment 342, 344, 346, 348, 350 and a distal arm segment 343, 345, 347, 349, 351. The proximal arm segments 342, 344, 346, 348, 350 extend from the spine 320, and the distal arm segments 343, 345, 347, 349, 351 extend from the ends of the proximal arm segments 342, 344, 346, 348, 350. The end of the distal arm segments 343, 345, 347, 349, 351 may form cavity inlets 433, 435, 437, 439, 441 for the cavities 432, 434, 436, 438, 440 with the respective underlying structure. For example, the end of distal arm segment 343 forms a cavity inlet 433 for cavity 432 with underlying arm 334. In this particular embodiment, the end of distal arm segment 343 forms the cavity inlet 433 with the upper side of the end of proximal arm segment 344, and so on for the other cavity inlets 435, 437, 439, 441. The inlets 433, 435, 437, 439, 441 fluidly couple the cavities 432, 434, 436, 438, 440 to the center passage 314.

In further embodiments, the arms 332, 334, 336, 338, 340 may have three or more segments. In some embodiments, the support spine 320 may more broadly be considered a side wall. While the example of FIG. 5 depicts five outer cavities 462, 464, 466, 468, 470, it will be appreciated that configurations with a greater or fewer number of cavities are possible. Additional information about arm arrangement 330 and cavities 432, 434, 436, 438, 440 is provided below.

Generally, the outer arm arrangement 360 may have a similar or dissimilar configuration to the inner arm arrangement 330. In the depicted embodiment of FIG. 5, the arrangements 330, 360 have a generally symmetrical configuration on opposing sides of the passage 314. In particular, the outer arm arrangement 360 includes a number of arms 362, 364, 366, 368, 370 that collectively form the outer cavities 462, 464, 466, 468, 470. For example, the lower surface of arm 362 and upper surface of arm 364 form inner cavity 462 with side wall 322. Similarly, arms 364, 366 form cavity 464; arms 366, 368 form cavity 466; and arms 368, 370 form cavity 468. Arm 370 forms the bottom-most cavity 470 with the base surface 312. Each of the outer arms 362, 364, 366, 368, 370 is formed by at least two arm segments 372, 373; 374, 375; 376, 377; 378, 379; 380, 381. In particular, each outer arm 362, 364, 366, 368, 370 is formed by a proximal arm segment 372, 374, 376, 378, 380 and a distal arm segment 373, 375, 377, 379, 381. The proximal arm segments 372, 374, 376, 378, 380 extend from the side wall 322, and the distal arm segments 373, 375, 377, 379, 381 extend from the ends of the proximal arm segments 372, 374, 376, 378, 380. The end of the distal arm segments 373, 375, 377, 379, 381 may form cavity inlets 463, 465, 467, 469, 471 for the cavities 462, 464, 466, 468, 470 with the respective underlying structure. For example, the end of distal arm segment 373 forms a cavity inlet 463 for cavity 462 with underlying arm 364. In this particular embodiment, the end of distal arm segment 373 forms the cavity inlet 463 with the upper side of the end of proximal arm segment 374, and so on for the other cavity inlets 465, 467, 469, 471. The inlets 463, 465, 467, 469, 471 fluidly couple the cavities 462, 464, 466, 468, 470 to the center passage 314.

In further embodiments, the arms 362, 364, 366, 368, 370 may have three or more segments. While the example of FIG. 5 depicts five outer cavities 462, 464, 466, 468, 470, it will be appreciated that configurations with a greater or fewer number of cavities are possible. Additional information about arm arrangement 360 and cavities 462, 464, 466, 468, 470 is provided below.

Figure 6:
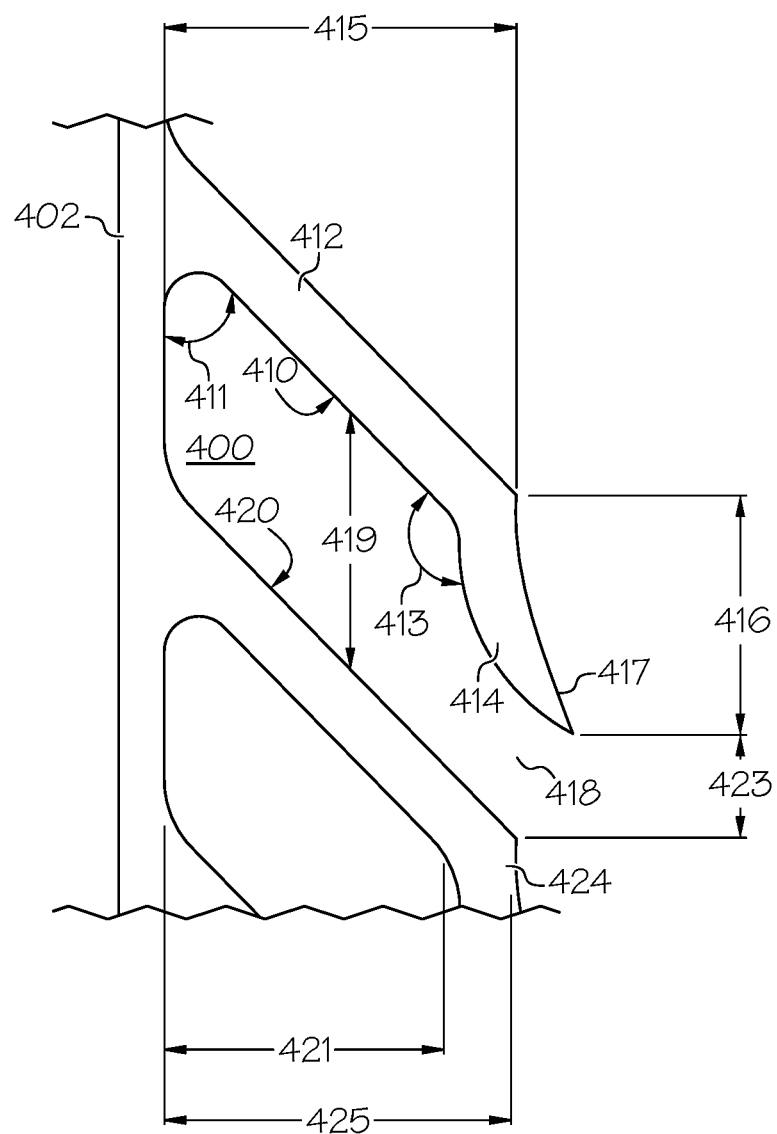
FIG. 6 is a partial cross-sectional view of a portion of a stacked cavity structure in accordance with an exemplary embodiment.

The inner arms 332, 334, 336, 338, 340; inner cavities 432, 434, 436, 438, 440; outer arms 362, 364, 366, 368, 370; and outer cavities 462, 464, 466, 468, 470 may have any suitable arrangement and/or configuration to facilitate sound attenuation. Reference is briefly made to FIG. 6, which is an example cavity 400 used to describe potential variations. Generally, the cavity 400 may correspond to any of the cavities 432, 434, 436, 438, 440; 462, 464, 466, 468, 470 described above, as well as the additional cavities described below.

As above, the cavity 400 may be formed by a first arm 410 and a second arm 420 extending from a wall 402 (e.g., a side wall or spine). The first arm 410 is formed by a proximal arm segment 412 and a distal arm segment 414, and the second arm 420 is formed by a proximal arm segment 422 and a distal arm segment 424. Generally, the configuration of the arm segments 412, 414, 422, 424 provides the shape and structure of the cavity 400, thereby enabling the associated parameters to be varied in order to result in desired noise attenuation characteristics.

For example, with respect to the first arm 410, the proximal arm segment 412 may extend from the wall 402 at a first angle 411, and the distal arm segment 414 may extend from the proximal arm segment 412 at a second angle 413. The first and second angles 411, 413 may be any suitable angle, including angles of 90°, less than 90°, or greater than 90°, as described below. In particular, the first angle 411 may be between 0° and 180° relative to the wall 402 and the second angle 413 may be less than 180° or greater than 180° relative to the proximal arm segment 412. In other words, the distal arm segment 414 is not aligned with the proximal arm segment 412 (e.g., a non-180° angle between segments 412, 414). The angles of arms segments 412, 414 may also be considered with respect to a longitudinal axis, such as the longitudinal axis of the wall 402. As shown, the angles are different to result in the relative angle 413 between the segments 412, 414.

Additionally, the proximal arm segment 412 may extend from the wall 402 at a first radial length 415, and the distal arm segment 414 may extend from the proximal arm segment 412 at a first axial length 416. The arm segments 412, 414 may be curved or straight. For example, in the depicted embodiment, the distal arm segment 414 is slightly curved and/or extends from proximal arm segment 412 with a slight curve. Additionally, in this embodiment, the distal arm segment 414 terminates at a tapered or angled end 417. The second arm 420 may have similar or different angles and/or lengths (unlabeled) than those of the first arm 410. In any event, the arms 410, 420 result in a cavity 400 with a particular internal volume between the wall 402 and an inlet 418 that is fluidly coupled to a passage (unlabeled) extending to a top surface. Various other parameters of the cavity 400 may be considered, such as one or more heights (e.g., maximum cavity height 419, inlet height 423) and lengths (e.g., length 421 between wall 402 and a first end of distal arm segment 414, length 425 between wall 402 and inlet 418). Other parameters may include the volume, length, or width of the center passage (e.g., passage 314 of FIG. 5), as well as inlet length, as discussed below.

In one embodiment, the arms 410, 420 are configured such that the height (and volume) of the cavity 400 tapers or decreases between the wall 402 and inlet 418. For example, the cavity height 419 is greater than the inlet height 423. This arrangement creates a converging inlet 418 for the cavity 400

As introduced above, the cavity 400, individually and collectively with other cavities, is designed for sound attenuation. As an example, during operation, as the sound wave enters the device inlet (e.g., inlet 222) and center passage (e.g., passage 314), portions of the wave enter the cavity 400, thereby creating localized resonant effects. In particular, the entering pressure waves may create localized waves at different amplitudes and phases that pass through the cavity 400 and are reflected by the interior wall 402 back towards the cavity inlet 418. As new pressure waves enter the cavity inlet 418, and new localized waves are created, the entering waves and reflected waves may result in cancellations as passive destructive interference, thereby resulting in sound attenuation. Additionally, modifications to the acoustic velocity of the sound waves may operate to attenuate sound. In particular, sound waves entering the inlet 418 may accelerate and/or redirect the acoustic velocity at various positions. The local sound-induced acceleration of fluid through a narrow channel can result in the formation of vortices, providing a mechanism to extract energy from the sound wave and dissipate it through vortical motion. For example, a pair (or more) of vortices may be created at the end 417 that propagate until encountering a surface (e.g., wall 402 or surface of arms 410, 420), which may result in vortices rotating in opposite directions, thereby canceling or dissipating the sound waves.

Typically, the intent is to absorb or attenuate as much sound as possible. In some instances, different cavities may be configured to "capture" or otherwise attenuate different frequencies of noise. As noted above, since absorption may be a function of frequency, the cavities may be designed to absorb sound at different frequencies to absorb the maximum amount of sound. In addition to parameters discussed above, the parameters that may be varied include the number of cavities; the volume of cavities; the spacings between walls and surfaces; the inner and outer volumes within the device; the lengths and/or angles of the arm segments; the lengths and/or angles of the side walls and/or spines; the areas and lengths of the cavity inlets; angles of device orientation; and/or interior angles and/or radii of curvature within each cavity.

Returning to FIG. 5 and as discussed above, the stacked cavity structure 220 is annular with a center passage 314 in between opposing arm arrangements 330, 360. As noted above, in this embodiment, the structure 220 has a generally circular cross-sectional shape in a circumferential-radial plane. However, other shapes may be provided, including hexagonal or "honeycomb," square, or irregular. In further embodiments, the stacked cavity structure 220 may not be annular. In other words, the cavities may extend across a panel, parallel to air flow or perpendicular to air flow. In other embodiments, the stacked cavity structure may not have opposing cavities, e.g., the structure 220 of FIG. 5 may be formed with only the inner cavities 432, 434, 436, 438, 440 or only the outer cavities 462, 464, 466, 468, 470.

Additional device structures are discussed below. As examples, FIGS. 7-11 provide example structures 500, 600, 700, 800, 900 according to other embodiments.

Figure 7:
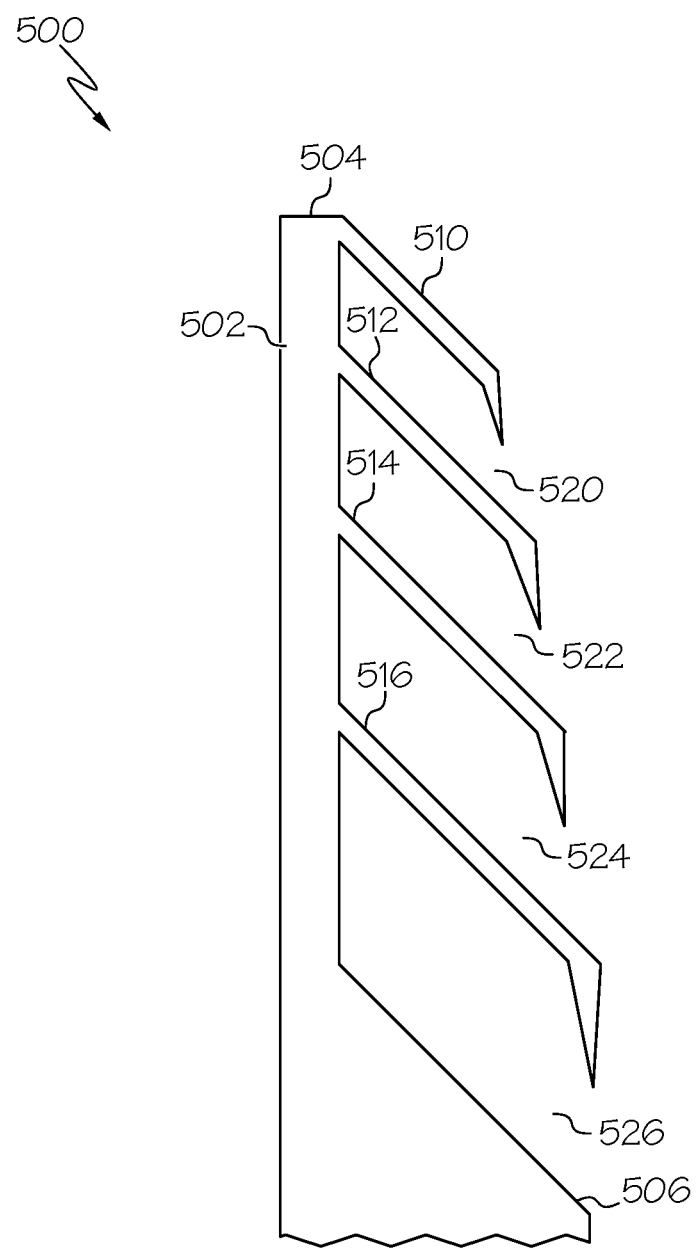
FIGS. 7-11 are partial cross-sectional views of stacked cavity structures in accordance with further exemplary embodiments.

As one example, FIG. 7 is a partial cross-sectional view of a stacked cavity structure 500 that may be incorporated into a sound (or noise) attenuation apparatus. The structure 500 may be annular or non-annular. In this example, arms 510, 512, 514, 516 extend from a wall 502 to form cavities 520, 522, 524, 526 along a depth from an outer surface 504 that faces an area with sound for attenuation to a base surface 506. As shown, the cavities 520, 522, 524, 526 may increase in volume along the depth with arms 510, 512, 514, 516 having increasing lengths. In other examples, the cavities 520, 522, 524, 526 may decrease in volume along the depth, and the arms 510, 512, 514, 516 may become shorter.

Figure 8:
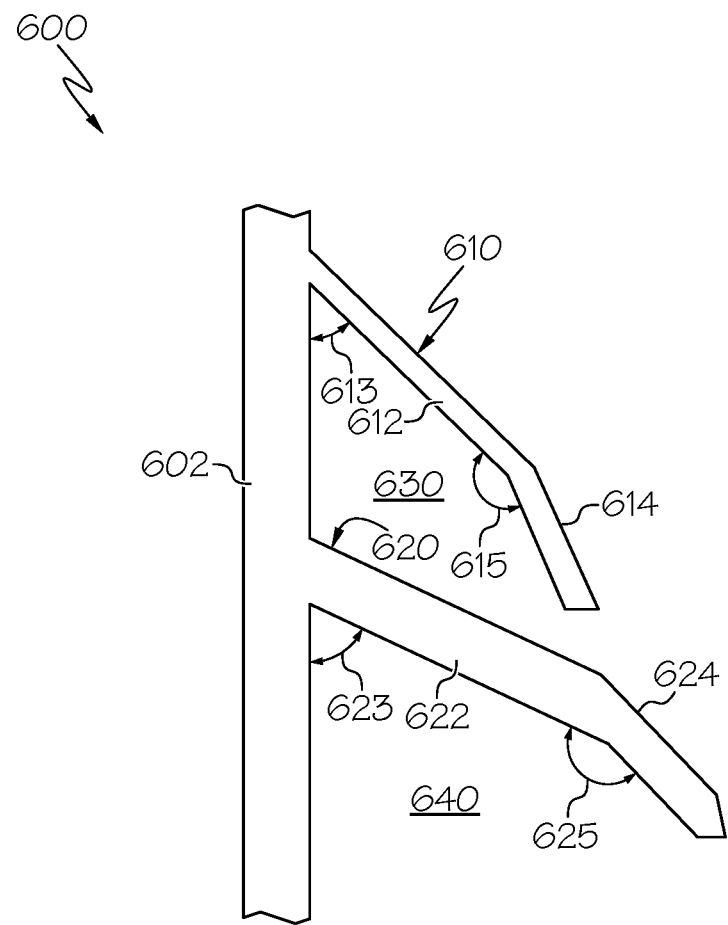

As a further example, FIG. 8 is a partial cross-sectional view of stacked cavity structure 600 that may be incorporated into a sound attenuation apparatus. The structure 600 may be annular or non-annular. In this example, arms 610, 620 extend from a wall 602 to form cavities 630, 640. As shown, the arms 610, 620 may include segments 612, 614; 622, 624 having various angles 613, 615; 623, 625, for example, in order to provide configuration characteristics to attenuate sound at particular frequencies.

Figure 9:
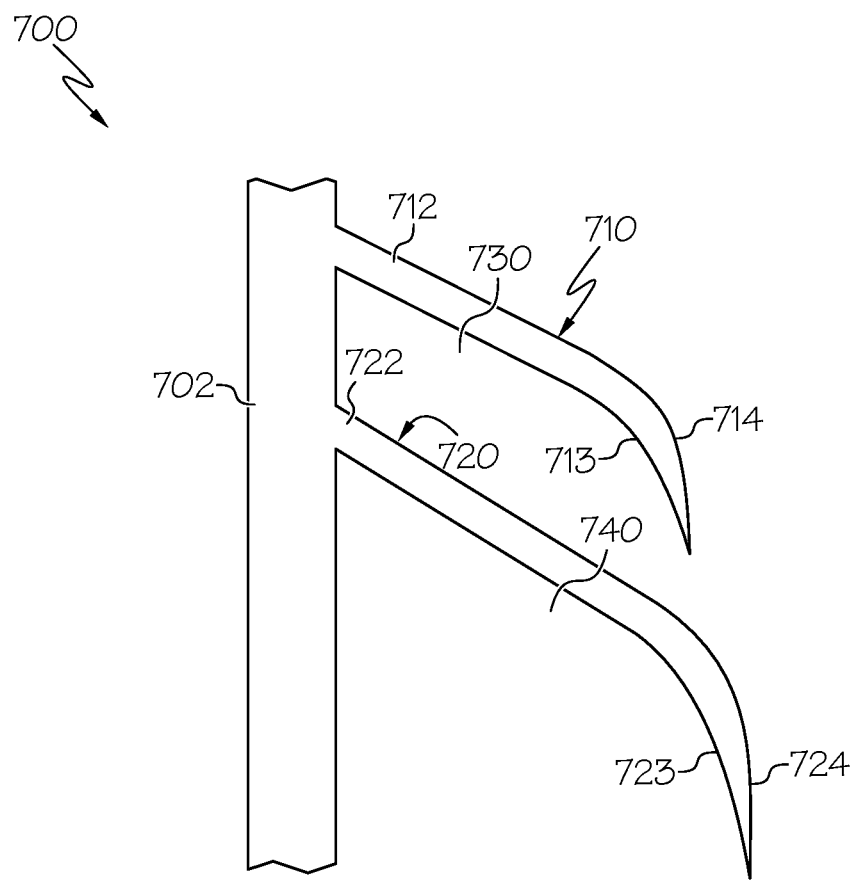

As a further example, FIG. 9 is a partial cross-sectional view of stacked cavity structure 700 that may be incorporated into a sound attenuation apparatus. The structure 700 may be annular or non-annular. In this example, arms 710, 720 extend from a wall 702 to form cavities 730, 740. As shown, the arms 710, 720 may include segments 712, 714; 722, 724. In this particular example, the distal segments 714, 724 may be joined to the proximal segments 712, 722 with curved portions 713, 723, for example, in order to provide configuration characteristics to attenuate sound at particular frequencies.

Figure 10:
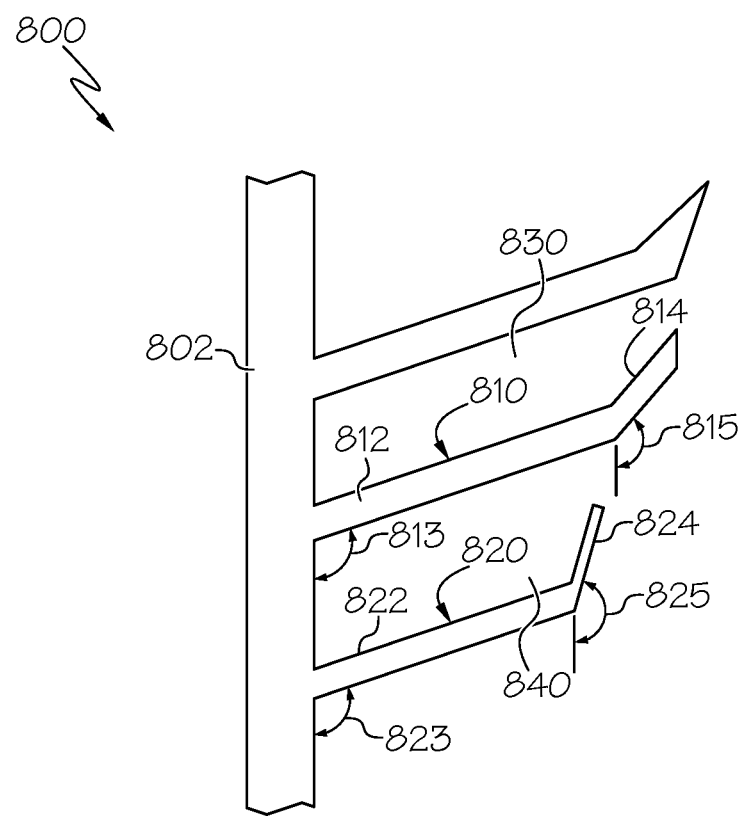

As a further example, FIG. 10 is a partial cross-sectional view of stacked cavity structure 800 that may be incorporated into a sound attenuation apparatus. The structure 800 may be annular or non-annular. In this example, arms 810, 820 extend from a wall 802 to form cavities 830, 840. As shown, the arms 810, 820 may include segments 812, 814; 822, 824 having various angles 813, 815; 823, 825. In this particular configuration, the angles 813, 815; 823, 825 are greater than 90° relative to a longitudinal axis. In effect, the arms 810, 820 are pointing "upwards" towards the inlet of the structure 800, for example, in order to provide configuration characteristics to attenuate sound at particular frequencies.

Figure 11:
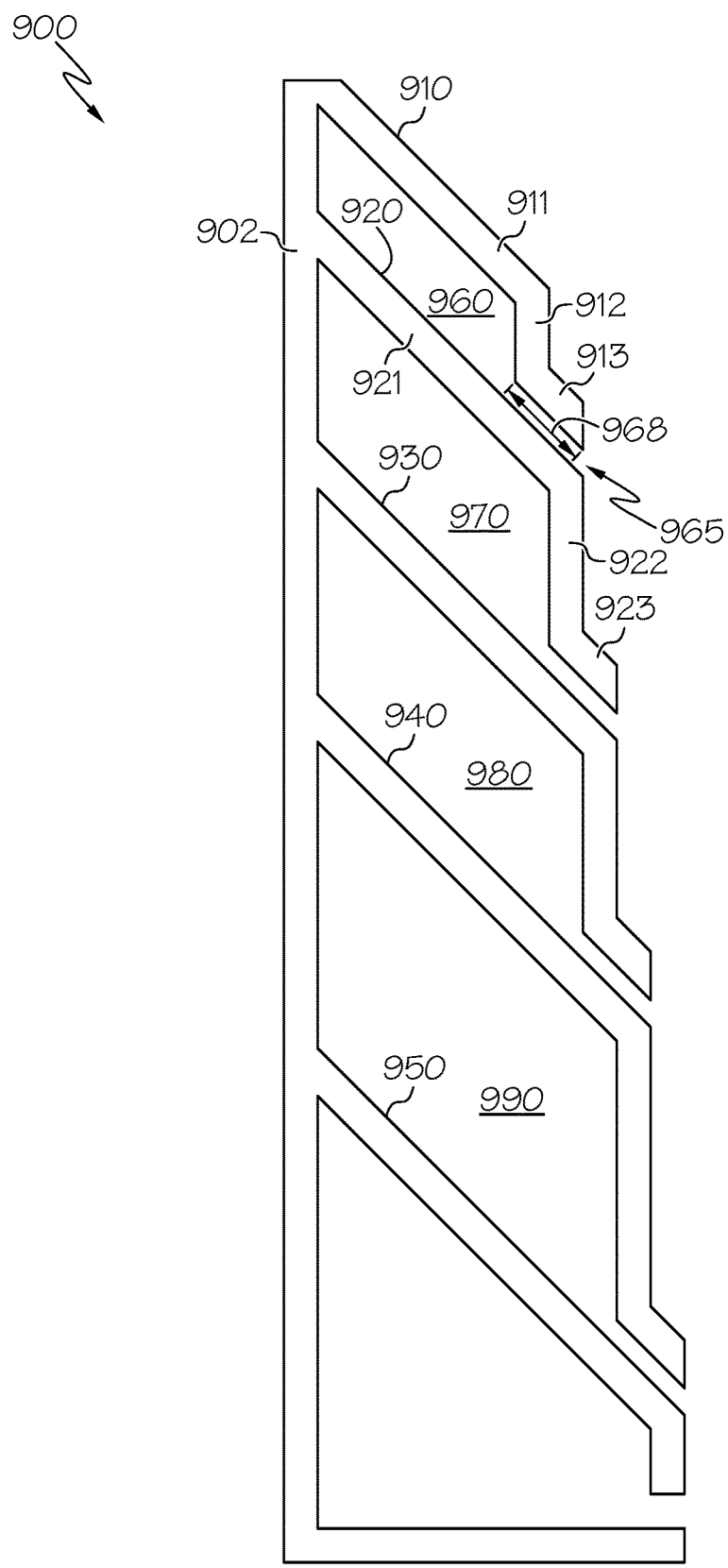

As a further example, FIG. 11 is a partial cross-sectional view of stacked cavity structure 900 that may be incorporated into a sound attenuation apparatus. The structure 900 may be annular or non-annular. In this example, arms 910, 920, 930, 940, 950 extend from a wall 902 to form cavities 960, 970, 980, 990. As shown, the arms 960, 970, 980, 990 may include a number of segments. For example, arm 910 is formed by three segments 911, 912, 913, and arm 920 is formed by three segments 921, 922, 923. In the example embodiment of FIG. 11, the one or more of the cavity inlets may be considered to have a cavity length between generally parallel portions of respective upper and lower arms. For example, inlet cavity 965 may be considered to have a length between the underside of segment 913 of arm 910 and the upper side of segment 921 of arm 920. The inlet lengths of different cavities 960, 970, 980, 990 may vary relative to one another.

Additional arm segments may provide a more tailored cavity shape (e.g., cavities 960, 970, 980, 990) or cavity inlet shape or length (e.g., length 968 of cavity inlet 965), for example, in order to provide configuration characteristics to attenuate sound at particular frequencies. Further the arms may have the same or different number of segments, such as arms 910, 920, 930, 940 having three segments and arm 950 having two segments. Other embodiments may have arms with more than three segments and/or include one or more arms with only a single segment.

Figure 12:
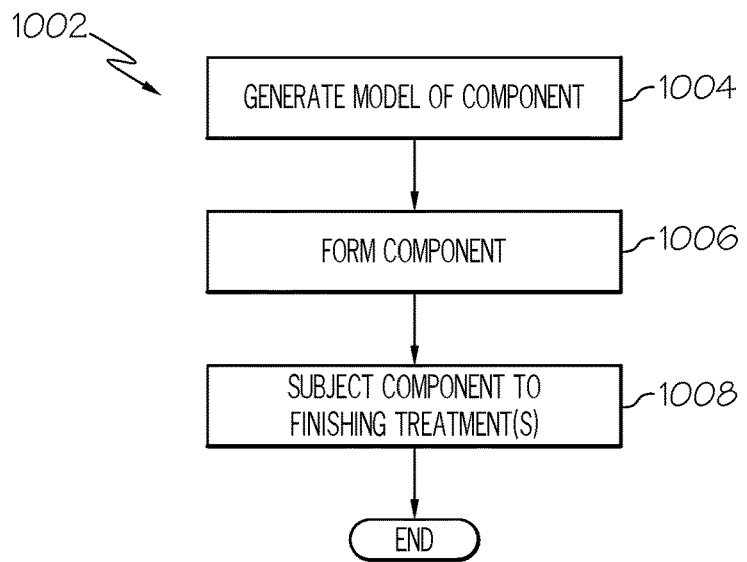
FIG. 12 is a flow diagram illustrating steps in a method of manufacturing a portion of a sound attenuation apparatus, such as that shown in FIG. 2, in accordance with an exemplary embodiment.

Additive manufacturing techniques may be used to manufacture the complex pattern of passages and cavities that may not otherwise be feasible using current manufacturing techniques. FIG. 12 is a flowchart illustrating a method 1002 for manufacturing a component, for example a sound attenuation apparatus 200 as described above with regard to FIG. 2 (as well as other embodiments), using, in whole or in part, powder bed additive manufacturing techniques based on low energy density energy beams. In a first step 1004, a model, such as a design model, of the apparatus 200 may be defined in any suitable manner. For example, the model may be designed with computer aided design (CAD) software and may include three-dimensional ("3D") numeric coordinates of the entire configuration of the apparatus including both external and internal surfaces. In one exemplary embodiment, the model may include a number of successive two-dimensional ("2D") cross-sectional slices that together form the 3D component.

In step 1006 of the method 1002, the apparatus is formed according to the model of step 1004. In one exemplary embodiment, a portion of the apparatus is formed using a rapid prototyping or additive layer manufacturing process. In other embodiments, the entire apparatus is formed using a rapid prototyping or additive layer manufacturing process.

Some examples of additive layer manufacturing processes include: selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; fused deposition; stereo-lithography; and selective laser melting ("SLM"). In general, powder bed additive manufacturing techniques provide flexibility in free-form fabrication without geometric constraints, fast material processing time, and innovative joining techniques. In one particular exemplary embodiment, SLM is used to produce the component in step 1006. SLM is a commercially available laser-based rapid prototyping and tooling process by which complex parts may be directly produced by precision melting and solidification of metal powder into successive layers of larger structures, each layer corresponding to a cross-sectional layer of the 3D component.

As such, in one exemplary embodiment, step 1006 is performed with SLM techniques to form the apparatus 200. However, prior to a discussion of the subsequent method steps, reference is made to FIG. 13, which is a schematic view of a SLM system 1000 for manufacturing the apparatus.

Figure 13:
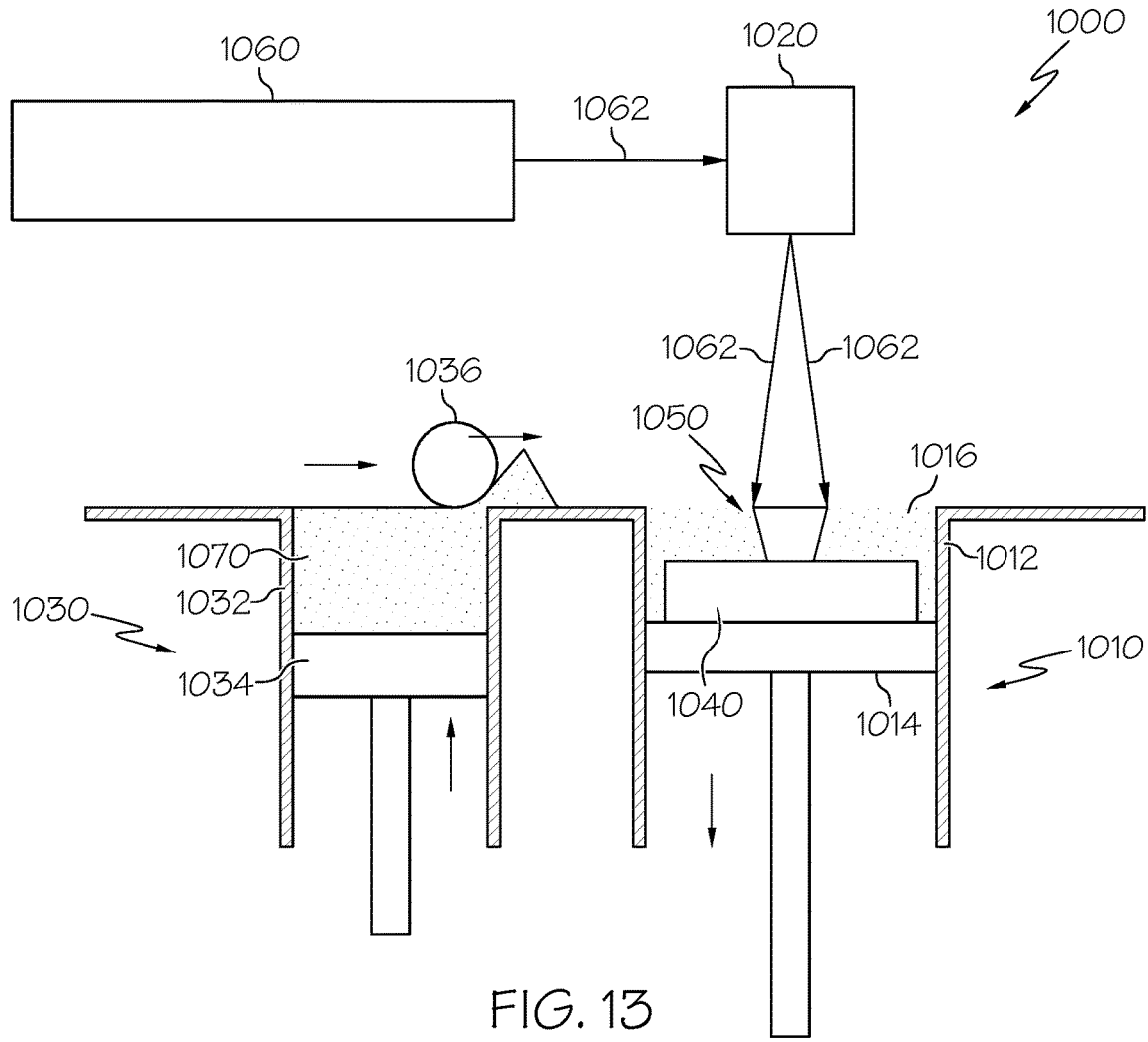
FIG. 13 is an exemplary additive manufacturing system suitable for use in the method of FIG. 12 in accordance with an exemplary embodiment.

Referring to FIG. 13, the system 1000 includes a fabrication device 1010, a powder delivery device 1030, a scanner 1020, and a low energy density energy beam generator, such as a laser 1060 (or an electron beam generator in other embodiments) that function to manufacture the article 1050 (e.g., the apparatus 200) with build material 1070. The fabrication device 1010 includes a build container 1012 with a fabrication support 1014 on which the article 1050 is formed and supported. The fabrication support 1014 is movable within the build container 1012 in a vertical direction and is adjusted in such a way to define a working plane 1016. The delivery device 1030 includes a powder chamber 1032 with a delivery support 1034 that supports the build material 1070 and is also movable in the vertical direction. The delivery device 1030 further includes a roller or wiper 1036 that transfers build material 1070 from the delivery device 1030 to the fabrication device 1010.

During operation, a base block 1040 may be installed on the fabrication support 1014. The fabrication support 1014 is lowered and the delivery support 1034 is raised. The roller or wiper 1036 scrapes or otherwise pushes a portion of the build material 1070 from the delivery device 1030 to form the working plane 1016 in the fabrication device 1010. The laser 1060 emits a laser beam 1062, which is directed by the scanner 1020 onto the build material 1070 in the working plane 1016 to selectively fuse the build material 1070 into a cross-sectional layer of the article 1050 according to the design. More specifically, the speed, position, power, and other operating parameters of the laser beam 1062 are controlled to selectively fuse the powder of the build material 1070 into larger structures by rapidly melting the powder particles that may melt or diffuse into the solid structure below, and subsequently, cool and re-solidify. As such, based on the control of the laser beam 1062, each layer of build material 1070 may include unfused and fused build material 1070 that respectively corresponds to the cross-sectional passages and walls that form the article 1050. In general, the laser beam 1062 is relatively low power to selectively fuse the individual layer of build material 1070. As an example, the laser beam 1062 may have a power of approximately 50 to 500 Watts, although any suitable power may be provided.

Upon completion of a respective layer, the fabrication support 1014 is lowered and the delivery support 1034 is raised. Typically, the fabrication support 1014, and thus the article 1050, does not move in a horizontal plane during this step. The roller or wiper 1036 again pushes a portion of the build material 1070 from the delivery device 1030 to form an additional layer of build material 1070 on the working plane 1016 of the fabrication device 1010. The laser beam 1062 is movably supported relative to the article 1050 and is again controlled to selectively form another cross-sectional layer. As such, the article 1050 is positioned in a bed of build material 1070 as the successive layers are formed such that the unfused and fused material supports subsequent layers. This process is continued according to the modeled design as successive cross-sectional layers are formed into the completed desired portion, e.g., the apparatus of step 1006.

The delivery of build material 1070 and movement of the article 1050 in the vertical direction are relatively constant and only the movement of the laser beam 1062 is selectively controlled to provide a simpler and more precise implementation. The localized fusing of the build material 1070 enables more precise placement of fused material to reduce or eliminate the occurrence of over-deposition of material and excessive energy or heat, which may otherwise result in cracking or distortion. The unused and unfused build material 1070 may be reused, thereby further reducing scrap.

Any suitable laser and laser parameters may be used, including considerations with respect to power, laser beam spot size, and scanning velocity. The build material 1070 may be any metallic or nonmetallic material suitable for additive manufacturing, as is known in the art. In general, the powder build material 1070 may be selected for enhanced strength, durability, and useful life, particularly at high temperatures, although as described below, the powder build material 1070 may also be selected based on the intended function of the area being formed.

Returning to FIG. 12, at the completion of step 1006, the article 1050, i.e., the apparatus 200, may be given a stress relief treatment and then is removed from the powder bed additive manufacturing system (e.g., from the SLM system 1000). In optional step 1008, the component formed in step 1006 may undergo finishing treatments. Finishing treatments may include, for example, polishing and/or the application of coatings. If necessary, the apparatus may be machined to final specifications.

Accordingly, the exemplary embodiments described herein provide sound attenuation apparatus that includes stacked cavities to provide passive destructive interference, dissipation, and/or absorption. Additive manufacturing techniques may be used to manufacture the structures described herein. Since embodiments described herein does not require active techniques, such as a speaker or a secondary sound source, problems associated with active sound control (e.g., energy use of equipment, processing speed and capability to match the acoustic signal, difficulties with coping with varying sounds, and difficulties with sound control in big or unconfined spaces) may be avoided.

According to the foregoing configurations, each structure may have characteristics suitable for attenuating sound at a different frequency or set of frequencies. The number of chambers, the size of the chambers, the angle of orientation, and the number and size of apertures connecting to the chambers may be adjusted to maximize the acoustic attenuation over the desired frequency range. The analysis of a sound source will reveal the frequencies and level of sound generated at each frequency. Based on this information, an apparatus can be designed that includes various cavity configurations that "tailor" the apparatus to attenuate the exact sound that is being generated. More specifically, an apparatus may include various configurations to "tune" the apparatus for sound suppression of a specifically-identified sound source. In particular, embodiments provide more degrees of freedom to tune the apparatus to suppress desired frequencies.

Embodiments provide solutions in a manner that may avoid conventional liner constructions, such as significant additional weight and cost. Instead, apparatus are provided in a manner that is more effective, lightweight, and versatile. As such, these embodiments may satisfy challenging customer demands and regulatory noise requirements across aerospace products, including propulsion engines, APUs, ECS systems, valves, etc.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A sound attenuation apparatus for arrangement on a mounting surface of a duct, comprising:
   a body with an interior extending between a bottom surface facing the mounting structure and a top surface; and
   a stacked cavity structure comprising
      a structure inlet formed in the top surface of the body;
      a passage extending from the structure inlet into the interior of the body to a base surface within the interior of the body;
      a first cavity with a first cavity inlet fluidly coupled to the passage and being formed by a first arm, a first side wall within the interior of the body with a first side wall longitudinal axis, and the base surface, wherein the first arm extends from the first side wall and includes at least two first arm segments oriented at different angles relative to the first side wall longitudinal axis; and
      a second cavity with a second cavity inlet fluidly coupled to the passage and being formed by a second arm, the first side wall, and the first arm, wherein the second arm extends from the first side wall and includes at least two second arm segments oriented at different angles relative to the first side wall longitudinal axis.

2. The sound attenuation apparatus of claim 1, wherein the stacked cavity structure further comprises
   a third cavity with a third cavity inlet fluidly coupled to the passage and being formed by a third arm, a second side wall within the interior of the body with a second side wall longitudinal axis, and the base surface, wherein the third arm extends from the second side wall and includes at least two third arm segments oriented at different angles relative to the second side wall longitudinal axis; and
   a fourth cavity with a fourth cavity inlet fluidly coupled to the passage and being formed by a fourth arm, the second side wall, and the third arm, wherein the fourth arm extends from the second side wall and includes at least two fourth arm segments oriented at different angles relative to the second side wall longitudinal axis.

3. The sound attenuation apparatus of claim 2, wherein the first and second cavity inlets are on an opposite side of the passage relative to the third and fourth cavity inlets.

4. The sound attenuation apparatus of claim 3, wherein the second wall is a support spine with a longitudinal axis, and wherein the first, second, third, and fourth cavities are extend about the longitudinal axis.

5. The sound attenuation apparatus of claim 1,
   wherein the at least two first arm segments of the first arm include a proximal first arm segment with a first end positioned on the first side wall and extending away from the first side wall to a second end and a distal first arm segment with a first end positioned on the second end of the proximal first arm segment and extending away from the proximal first arm segment to a second end, and
   wherein the at least two second arm segments of the second arm include a proximal second arm segment with a first end positioned on the first side wall and extending away from the first side wall to a second end and a distal second arm segment with a first end positioned on the second end of the proximal second arm segment and extending away from the proximal second arm segment to a second end.

6. The sound attenuation apparatus of claim 1, wherein the at least two first arm segments of the first arm include a proximal first arm segment with a first end positioned on the first side wall and extending away from the first side wall to a second end, at least one intermediate first arm segment with a first end positioned on the second end of the proximal first arm segment and extending away from the proximal first arm segment to a second end, and a distal first arm segment with a first end positioned on the second end of the at least one intermediate first arm segment and extending away from the at least one intermediate first arm segment to a second end.

7. The sound attenuation apparatus of claim 1, wherein the at least two first arm segments of the first arm include a proximal first arm segment extending from the first side wall at a first interior angle of less than 90°.

8. The sound attenuation apparatus of claim 1, wherein the first cavity defines a first volume and the second cavity defines a second volume, different from the first volume.

9. The sound attenuation apparatus of claim 1, wherein the first cavity has a first height proximate to the first side wall that is greater than a second height at the first cavity inlet.

10. The sound attenuation apparatus of claim 1, wherein the stacked cavity structure further comprises a third cavity with a third cavity inlet fluidly coupled to the passage and being formed by a third arm, the first side wall, and the second arm, wherein the third arm extends from the first side wall and includes at least two third arm segments oriented at different angles relative to the first side wall longitudinal axis.

11. The sound attenuation apparatus of claim 10, wherein the second cavity inlet defines a second cavity inlet length and the third cavity inlet defines a third cavity inlet length, different than the second cavity inlet length.

12. The sound attenuation apparatus of claim 1, wherein the stacked cavity structure has a hexagonal cross-sectional shape.

* * * * *